United States Patent
Moritani et al.

(10) Patent No.: US 6,288,165 B1
(45) Date of Patent: Sep. 11, 2001

(54) RESIN COMPOSITION COMPRISING A SAPONIFIED PRODUCT OF VINYL ACETATE POLYMER

(75) Inventors: Takeshi Moritani; Kaoru Ikeda, both of Kurashiki; Akimasa Aoyama, deceased, late of Kurashiki, by Akiko Aoyama, heir; Takaharu Kawahara; Yukihiro Ohara, both of Okayama; Naoshi Nakagawa; Toshinori Tsugaru, both of Osaka, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 08/985,873

(22) Filed: Dec. 5, 1997

(30) Foreign Application Priority Data

Jun. 26, 1995 (JP) ................................. 7-159515

(51) Int. Cl.$^7$ ................................................. C08F 8/00
(52) U.S. Cl. ...................................... 525/59; 525/60
(58) Field of Search .................. 524/533, 534; 525/59, 60

(56) References Cited

U.S. PATENT DOCUMENTS

| | | |
|---|---|---|
| 2,566,251 | 8/1951 | Richards . |
| 3,609,130 | 9/1971 | Manson et al. . |
| 3,755,237 | 8/1973 | Isaacs et al. . |
| 4,035,329 | 7/1977 | Wiest et al. . |
| 4,243,769 * | 1/1981 | Pritchett ............... 525/222 |
| 4,253,580 * | 3/1981 | Doi et al. ............... 215/228 |
| 4,279,795 * | 7/1981 | Yamashita et al. ....... 525/311 |
| 4,390,656 * | 6/1983 | Weise et al. ............ 524/493 |
| 4,448,906 * | 5/1984 | Deinet et al. ........... 523/122 |
| 4,503,185 | 3/1985 | Hausman et al. . |
| 4,548,979 * | 10/1985 | Weise et al. ............ 524/403 |
| 4,636,551 | 1/1987 | Okaya et al. . |
| 4,746,700 | 5/1988 | Takida . |
| 4,747,902 * | 5/1988 | Saitoh ................ 156/244.11 |
| 4,808,454 * | 2/1989 | Saitoh ................... 428/42 |
| 5,216,072 * | 6/1993 | Kim ...................... 525/60 |
| 5,223,571 * | 6/1993 | Igarashi et al. .......... 525/58 |
| 5,262,471 * | 11/1993 | Akao .................... 524/496 |
| 5,384,187 * | 1/1995 | Uemura et al. .......... 428/262 |
| 5,559,190 | 9/1996 | Nubel et al. . |

FOREIGN PATENT DOCUMENTS

| | | |
|---|---|---|
| 1 914 888 | 10/1969 | (DE) . |
| 0 144 723 | 6/1985 | (EP) . |
| 1 330 732 | 12/1969 | (FR) . |

OTHER PUBLICATIONS

"Sorption of flavors into packaging film and its depression"; Yutaka et al.; Document No. 121:279232, 1994.*

"Sorption of flavors into packaging film and its depression" Yutaka et al document No. 121:279232 1994.

"Reactivity of nonoterpenoids as degradative chain transfer agents" Kazuo et al document No. 99:122658 1982.

"EVA degration mechanisms simulating those in PV modules" Czanderna document No. 118:216432 1992.

* cited by examiner

Primary Examiner—Judy M. Reddick
(74) Attorney, Agent, or Firm—Oblon, Spivak, McClelland, Maier & Neustadt, P.C.

(57) ABSTRACT

A process for producing vinyl acetate polymers comprises, after polymerization of at least one monomer comprising vinyl acetate, adding a conjugated polyene having a boiling point of at least 20° C. Saponified products of the vinyl acetate polymers obtained by this process can give molded articles causing little coloring and generation of gel-like agglomerates.

16 Claims, No Drawings

RESIN COMPOSITION COMPRISING A SAPONIFIED PRODUCT OF VINYL ACETATE POLYMER

BACKGROUND OF THE INVENTION

1. Field of the Invention

The present invention relates to a process for producing vinyl acetate polymers, in particular ethylene-vinyl acetate copolymer, a process for producing high-quality saponified products of vinyl acetate polymers, particularly of ethylene-vinyl acetate copolymer, that are obtained by saponifying the same and cause little coloring and generation of gel-like agglomerates upon molding, and also to resin compositions comprising the saponified products.

2. Description of the Prior Art

Saponified products of vinyl acetate polymers have been used in a variety of applications utilizing their feature of having good hydrophilic property. Among the saponified products, that of ethylene-vinyl acetate is good in melt moldability and especially in oxygen barrier properties, oil resistance, antistatic property, mechanical strength and like properties and hence is useful as packaging material, such as film, sheet or container. The saponified product of ethylene-vinyl acetate copolymer should, when used for various packaging purposes, have the desired properties to meet the intended purposes and, in addition, should not cause even slight coloring of appearance, fish eyes, gel-like agglomerates, coarse grain and poor transparency.

However, the saponified product of ethylene-vinyl acetate copolymer tends to cause, on melt molding, the problems of coloring and generation of gel-like agglomerates. The following various measures have therefore been proposed to suppress the coloring and generation of gel-like agglomerates.

For example, many Japanese Patent Applications disclosing addition of acids such as acetic acid and phosphoric acid or salts thereof have been filed. See Japanese Patent Application Laid-open Nos. 25048/1973, 26993/1976, 28891/1976, 49294/1976, 91988/1976, 954/1977, 955/1977, 956/1977, 20044/1981, 41204/1981, 95043/1986, 95054/1986, 143954/1987 and others. They claim that saponified products of ethylene-vinyl acetate causing little coloring or gel-like agglomerates can be obtained by conducting solution polymerization of ethylene and vinyl acetate with a radical initiator in an organic solvent such as methanol, purging the unreacted vinyl acetate, saponifying the residue by adding an alkali catalyst and, after naturalization and washing, adding on acid such as acetic acid or phosphoric acid, and/or a salt thereof, following by drying.

On the other hand, Japanese Patent Application Laid-open No. 197603/1986 discloses a method of adding a specific aromatic compound after copolymerization of ethylene and vinyl acetate. That is, addition of a specific aromatic compound such as 2,4-diphenyl-4-methyl-1-pentene on completion of copolymerization of ethylene-vinyl acetate copolymer, followed by saponification, can yield a saponified product of the ethylene-vinyl acetate copolymer that generates no irregular odor on melt molding and gives films having good color shade and little fish eye.

As stated above, there have been taken a variety of measures against coloring or generation of gel-like agglomerates of saponified products of vinyl-acetate polymers, in particular that of ethylene-vinyl acetate copolymer.

However, with the addition of an acid such as acetic acid or phosphoric acid and/or a salt thereof, coloring or generation of gel-like agglomerates still occurs if sufficient neutralization and washing after saponification are not conducted or the acid such as acetic acid or phosphoric acid and/or a salt thereof are not added in appropriate amounts. To overcome this drawback, washing is now sufficiently conducted after saponification and the addition amounts of acetic acid or phosphoric acid and a salt thereof have been optimized, only to produce unsatisfactory results.

The addition of a specific aromatic compound (e.g. 2,4-diphenyl-4-methyl-1-pentene) is, as has become clear as a result of a repeating test conducted by the present inventors, can be hardly said to suppress coloring or generation of gel-like agglomerates sufficiently.

SUMMARY OF THE INVENTION

Accordingly, an object of the present invention is to provide a process for producing high-quality saponified products of vinyl acetate polymers, as obtained by saponification of vinyl acetate polymers, in particular ethylene-vinyl acetate copolymer, the saponified products causing little coloring and generation of gel-like agglomerates on molding.

Another object of the present invention is to provide a resin composition having the above excellent features.

The present invention provides a process for producing vinyl acetate polymers which comprises, after polymerizing at least one monomer comprising vinyl acetate, adding a conjugated polyene having a boiling point of at least 20° C.

The present invention also provides a process for producing saponified products of vinyl acetate polymers which comprises saponifying the vinyl acetate polymers obtained by the above process.

the present invention further provides a resin composition comprising a saponified product of a vinyl acetate polymer and 0.000001 to 1% by weight of a conjugated polyene having a boiling point of at least 20° C.

DETAILED DESCRIPTIONS OF THE PREFERRED EMBODIMENTS

The polyene referred to in the present invention has a structure compressing carbon-carbon double bonds and carbon-carbon single bonds alternately, in which the number of carbon-carbon double bonds is at least 2, and thus includes compounds having what is known as conjugated double bonds.

The polyene may be a conjugated diene having a structure comprising 2 carbon-carbon double bonds and one carbon-carbon single bond connected alternately, may be a conjugated triene having a structure comprising 3 carbon-carbon double bonds and 2 carbon-carbon single bond connected alternately, or may be a conjugated polyene having a structure comprising a larger number of carbon-carbon double bonds and carbon-carbon single bonds connected alternately. Accordingly, conjugated trienes such as 2,4,6-octstriene are included in the polyene used in the invention. However, the of polyenes having not more than 7 conjugated carbon-carbon double bonds are preferred, since those with 8 or more conjugated carbon-carbon double bonds will color by themselves.

Usable polyenes also include those comprising a plurality of conjugated double bonds containing at least 2 carbon-carbon double bonds, each of which does not conjugate together. For example, tung oil, which has 3 conjugated trienes in a molecule, is also included in the polyene used in the invention.

These polyenes may contain, in addition to the above conjugated double bonds, other functional groups, e.g. carboxyl group and salts thereof, hydroxyl group, ester group, carbonyl group, ether group, amino group, imino group, amide group, cyano group, diazo group, nitro group, sulfone group, sulfoxide group, sulfide group, thiol group, sulfonic acid and salts thereof, phosphoric acid and salts thereof, phenyl group, halogen atoms, double bond and triple bond. These functional groups may either be directly bound to the carbon atoms constituting the conjugated double bonds or bound to an optional location apart from the conjugated double bonds. This means that a multiple bond contained in the functional group may be located at a position conjugatable with the above conjugated double bonds. For example, 1-phyenylbutadiene having a phenyl group and sorbic acid having a carboxyl group are also included in the polyene used in the invention.

Too large an amount of the polyene remaining in the resulting saponified products is not always desirable, because it causes generation of bad odor, oozing out and like unfavorable effects, in consideration that the products are widely used for packaging purposes. From this viewpoint, it is desirable, in order to obtain molded articles suited for packaging contains containing little residual polyene, to select those polyenes that have functional groups containing oxygen atom and are readily removable from the resulting resin during saponification and the succeeding washing step such as water washing. This is because these functional groups high polarity and excellent water affinity. Among such polyenes, those having carboxyl group or salts thereof, hydroxyl group or ester groups are particularly preferred. Carboxyl group or salts thereof and hydroxyl group have especially good affinity to water, while ester groups are hydrolyzed during saponification into carboxylic acids or salts thereof and hydroxyl groups. Polyenecarboxylic acids or salts or esters thereof are more particularly preferred, since they become the corresponding alkali metal salt during saponification to obtain still higher solubility in water.

Recovery and re-use of raw materials are frequently carried out in commercial production. From the viewpoint of easy separability from recovered unreacted vinyl acetate and methanol, the above polyenes having functional groups are generally more difficult to form azeotrope with vinyl acetate or methanol. They are hence more readily separable by distillation, than polyenes having no functional group. This point is another advantage.

Addition of the above conjugated polyenes make it possible to obtain saponified products of vinyl acetate polymers capable of giving molded articles with less coloring or generation of gel-like agglomerates as compared with the case of no such addition.

On the other hand, use of a compound conjugated with an aromatic ring, such as styrene, which, having a structure comprising a carbon-carbon double bond and the aromatic ring conjugatable therewith via a carbon-carbon single bond though, is not included in the polyene used in the invention, can produce only insufficiently the effect of suppressing coloring or generating of gel-like agglomerates. Likewise, compounds having a structure comprising a carbon-carbon double bond and a carbon-heteroatom double bond conjugatable therewith via a carbon-carbon single bond are not included in the polyene used in the invention. For example, with use of tiglic acid, which is a compound having a conjugated structure with the carbon-oxygen double bond of carboxyl group, almost no effect of suppressing the generation of gel-like agglomerates was observed. The heretoatom herein includes, in addition to the above oxygen atom, nitrogen, sulfur, phosphorus and like atoms.

Compounds having at least 2 carbon-carbon double bonds which are not connected alternately with carbon-carbon single bonds are not included in the polyene of the invention either. Accordingly, geraniol, squalene and the like, which have a plurality of non-conjugated carbon-carbon double bonds, are not included in the polyene of the present invention.

It is important that the polyene used in the invention have a boiling point as measured under atmospheric pressure of at least 20° C. Polyenes having a boiling point of less than 20° C. are gaseous under the conditions of room temperature and atmospheric pressure and will readily vaporize when added to the reaction mixture after polymerization. As a result, the resulting saponified products of vinyl acetate polymers cannot give molded articles causing little coloring or generation of gel-like agglomerates.

For example, the usual process for producing a saponified product of ethylene-vinyl acetate copolymer comprises adding a polyene after polymerization and thereafter, in general, removing ethylene remaining in the solution by evaporation under atmospheric pressure. At this time, if the polyene has a boiling point of less than 20° C., it will mostly evaporate, so that the effect of the present invention cannot be fully produced.

In fact, a trial using butadiene having a boiling point of −4.4° C. as polyene resulted in evaporation of most of the compound together with ethylene during removal of the ethylene by evaporation. Consequently the resulting saponified product of ethylene-vinyl acetate copolymer could not give molded articles causing little coloring or generation of gel-like agglomerates. From this fact it is considered that, in order to produce the effect of the polyene used in the invention, the presence of the polyene in the polymer during the succeeding steps may possibly play an important role. The boiling point is more preferably at least 40° C., which renders the evaporation more difficult.

Furthermore, use of a polyene having a boiling point higher than that of vinyl acetate can produce the above effects more markedly. That is, after ethylene has been evaporated off as described above, vinyl acetate is generally purged by evaporation by heating. On this occasion, use of a polyene having a boiling point higher than that of vinyl acetate can produce a saponified product of ethylene-vinyl acetate copolymer causing still lesser coloring or generation of gel-like agglomerates. Evaporating off of the polyene used prior to that of vinyl acetate seems to reduce the effect produced by the invention. It is therefore important that the polyene used be contained in the polymer during the purging of vinyl acetate. From this viewpoint, the boiling point of the polyene used is preferably at least 100° C. more preferably at least 130° C.

Concrete examples of the polyenes usable in the invention are conjugated dienes having a conjugated structure with 2 carbon-carbon double bonds, e.g. isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrane, sorbic acid, sorbic acid esters, sorbic acid salts and abietic acid; conjugated trienes having a conjugated structure with 3 carbon-carbon double bonds, e.g. 1,3,5-hexatriene, 2,4,6-octatriene-1-carboxylic acid, eleostearic acid, tung oil and cholecalciferol; and conjugated polyenes having a conjugated structure with 4 or more carbon-carbon double bonds, e.g. cyclooctatetraene, 2,4,6,8-decatetraene-1-carboxylic acid, retinol and retinoic acid.

Among the above, with those having a plurality of stereoisomers, such as 1,3-pentadiene, myrcene and farnesene, any one of such isomers is usable.

The above polymers may be used in combination of 2 or more, or may be used in combination with compounds other than polyenes, which can be added either separately or simultaneously.

Addition of these conjugated polyenes can produce molded articles of saponified products of vinyl acetate polymers causing less coloring and generation of gel-like agglomerates as compared with the case of no such addition.

That is, the object is achieved by adding a polyene having what is known as conjugated double bonds, i.e. having a structure comprising at least 2 carbon-carbon double bonds and carbon-carbon single bond(s) connected alternately and having a boiling point of at least 20° C.

On polymerization, any catalyst may be used with no specific limitation and there are usable, for example, azonitrile-based initiators, e.g. 2,2'-azobisisobutyronitrile, 2,2'-azobis-(2,4-dimethylvaleronitrile), 2,2'-azobis-(4-methyl-2,4-dimethylvaleronitrile) and 2,2'-azobis-(2-cyclopropylpropyonitrile) and organic peroxide-based initiators, e.g. isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

In order to obtain saponified products of vinyl acetate polymers capable of yielding molded articles that cause little coloring and generation of gel-like agglomerates, it is effective to use a polymerization catalyst having a short half life. It is thus desirable to use, concretely, a polymerization catalyst having a half life in methanol at 60° C. of not more than 5 hours, more preferably not more than 2 hours, and most preferably not more than 1 hour. Not quite clear is the reason when use of this type of catalyst having a short half life can lead to production of molded articles causing little coloring and generation of gel-like agglomerates. However, it is considered to be due to the fact that use of a catalyst having a short half life, i.e. having high activity, which permits the polymerization reaction to proceed quickly, can minimize occurrence of side reactions after completion of the polymerization. Examples of the catalyst with short half life are 2,2'-azobis-(4-methyl-2,4-dimethylvaleronitrile) (half life: 0.22 hour), diisopropyl peroxycarbonate (half life: 0.60 hour), di-n-propyl peroxydicarbonate (half life; 0.58 hour) and isobutyryl peroxide (half life; 0.07 hour).

From the viewpoint of effective use of catalyst, it is desirable to use an organic peroxide-based catalyst. This is because that the initiator efficiency on polymerization with an organic peroxide-based polymerization catalyst is generally larger than that with azonitrile-based one. The initiator efficiency herein means that ratio between the molecules actually contributing, on decomposition, to polymerization reaction and those that do not contribute thereto but simply decompose. It is known that while azonitrile-based catalysts generally have an initiator efficiency of 0.6 (i.e. 40% of the amount added deactivates without contributing to polymerization reaction), organic peroxide-based ones have one of about 0.8 to 1.0 (i.e. almost all amount contribute to the reaction). Larger initiator efficiency means smaller amount of the catalyst deactivating without contributing to reaction, resulting in smaller total amount of the catalyst being capable of maintaining the same polymerization rate, which reduces catalyst cost. Examples of the organic peroxide-base catalyst are cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

The vinyl acetate polymer in the present invention includes vinyl acetate homopolymer and copolymers of vinyl acetate with other monomers, among which representative one is ethylene-vinyl acetate copolymer.

The saponified product of vinyl acetate polymer in the present invention includes all of saponified products of the above vinyl acetate polymers, among which representative one is the saponified product of ethylene-vinyl acetate copolymer.

Next described are processes for producing ethylene-vinyl acetate copolymer, which is representative of the vinyl acetate polymer of the present invention, and those for the saponified product of ethylene-vinyl acetate copolymer, which are representative of the saponified products of vinyl acetate polymers of the present invention. Polymerization of ethylene and vinyl acetate can be effected by any one of solution polymerization, suspension polymerization, emulsion polymerization and bulk polymerization, either by continuous system or batch system. For example, the solution polymerization by batch system is conducted under the following conditions.

Solvent While an alcohol is desirable, other organic solvents capable of dissolving ethylene, vinyl acetate and ethylene-vinyl acetate copolymer, such as dimethyl sulfoxide, may also be used. Examples of the alcohol are methyl alcohol, ethyl alcohol, propyl alcohol, n-butyl alcohol and t-butyl alcohol, among which methyl alcohol is particularly preferred.

Catalyst The above described initiators, such as azonitrile-based and organic peroxide-based ones, are usable. However, with use of a catalyst having a short half life for batch system, it cannot be fed all at once but should be added continuously.

Temperature 20 to 90° C., preferably 40 to 70° C.

Time 2 to 15 hours, preferably 3 to 11 hours. With continuous polymerization, the average residence time in the polymerization vessel is desirably about the same.

Conversion 10 to 90%, preferably 30 to 80% based on the vinyl acetate fed.

Resin content in the solution after polymerization 5 to 85%, preferably 20 to 70%.

Ethylene content in the copolymer 5 to 60 mole %, preferably 10 to 50 mole %.

Monomers other than ethylene and vinyl acetate and being capable of copolymerizing therewith may be permitted to be present in combination. Examples of these monomers are α-olefins, e.g. propylene, isobutylene, α-octene and α-dodecene; unsaturated acids, e.g., acrylic acid, methacrylic acid, crotonic acid, maleic acid and itaconic acid, and anhydrides, salts and mono- or dialkylesters thereof; nitriles, e.g. acrylonitrile and methacrylonitrile; amides, e.g. acrylamide and methacrylamide; olefinasulfonic acids, e.g. ethylenesulfonic acid, allylsulfonic acid and methallysulfonic acid, and salts thereof; alkyl vinyl ethers; vinyl ketones; N-vinylpyrrolidone, vinyl chloride and vinylidene chloride.

After completion of prescribed time of polymrization and the desired degree of polymerization has been reached, at least one polyene is added. Then, after unreacted ethylene has been removed by evaporation, unreacted vinyl acetate is purged. The polyene is desirably added in the form of a solution in the solvent used for the polymerization or like solvents, in view of uniform dispersion. Likewise, from the viewpoint of uniform dispersion, solution polymerization is preferred to bulk polymerization.

Although the polyene may be added in any amount with no specific limitation, the amount is preferably about 0.0001 to 3% by weight based on the vinyl acetate fed, more preferably 0.0005 to 1% by weight and most preferably 0.001 to 0.5% by weight on the same basis.

After the addition of a polyene and removal of ethylene by evaporation, unreacted vinyl acetate is purged from the resulting ethylene-vinyl acetate copolymer solution. This purging is carried out by, for example, continuously feeding the copolymer solution at a constant rate through the upper part of a column packed with raschig rings and blowing an organic solvent vapor such as methanol through the lower part of the column, thereby flowing out a mixed vapor of the organic solvent such as methanol and the unreacted vinyl acetate through the column top, and withdrawing from the column bottom the copolymer solution from which the unreacted vinyl acetate has been removed.

An alkali catalyst is added to the copolymer solution thus withdrawn, to saponify the vinyl acetate component of the copolymer. The saponification can be effected either by continuous system or by batch system. Example of the alkali catalyst used here are sodium hydroxide, potassium hydroxide and alkali metal alcolates. The saponification of batch system is conducted, for example, under the following conditions.

Concentration of the copolymer solution: 10 to 50%

Reaction temperature: 30 to 60° C.

Amount of catalyst: 0.02 to 0.6 equivalent based in acetate group

Time: 1 to 6 hours

The degree of saponification after the saponification reaction can be optionally adjusted by controlling the saponification conditions and is generally at least 95% of the vinyl acetate component.

The saponified product of the copolymer after the reaction contains the alkali catalyst, byproduced salts and other impurities, which are removed by washing, for example with water. The polyene can also be removed by washing such as water washing, but the removability differs depending on the polarity of the polyene and like factors and a certain amount thereof will remain in the saponified product. To the thus obtained saponified product of the copolymer, there may be added an acid or a partial salt of polybasic acid, such as phosphoric acid, pyrophosphoric acid, phosphorous acid, oxalic acid, succinic acid, adipic acid, tartaric acid, citric acid, sodium dihdyrogenphosphate, potassium dihydrogenphosphate or acetic acid. Drying is lastly conducted, to obtain the desired saponified product of ethylene-vinyl acetate copolymer.

It is desirable that the finished product in the dry state contain the polyene used in an amount of 0.00001 to 1% by weight, which insures that the product gives molded articles little colored and containing little gel-like agglomerates. The content is more preferably 0.00001 to 0.5% by weight and most preferably 0.0001 to 0.2% by weight.

The saponified product of ethylene-vinyl acetate of the present invention desirably has a melt index (MI) (measured at 190° C., under a load of 2160 g; with these having a melting point of about of exceeding 190° C., obtained by measuring under a load of 2160 g and at a plurality of temperatures higher than the melting point, plotting the measurements on a semi-logarithmic graph with the abscissa representing the inverse of absolute temperature and the ordinate the melt index, and extrapolating to 190° C. of 0.1 to 200 g/10 min., more preferably 0.2 to 100 g/10 min.

The thus obtained composition comprising the saponified product of ethylene-vinyl acetate copolymer and, for example, 0.000001 to 1% by weight of the polyene used can be melt molder into various shaped articles such as films, sheets, containers, pipes and fibers. These molded articles can be pulverized and molded again for re-use. The obtained films, sheets, fibers and the like can be monoaxially or biaxially stretched. The melt molding can be carried out by extrusion molding, tubular film process, blow molding, melt spinning, injection molding or like processes. It is possible to melt mold a blend of 2 or more of the saponified products of the ethylene-vinyl acetate copolymer differing in the degree of polymerization, ethylene content or saponification degree. It is also possible to add to the saponified product of the copolymer appropriate amounts of additives such as various plasticizers, stabiliers, surfactants, crosslinking agents, metal salts, fillers and various fibers. These processes give molded articles little colored and having little gel-like agglomerates.

It is further possible to add an appropriate amount of a thermoplastic resin other than the saponified product of the copolymer. Examples of thermoplastic resins usable for this purpose are various polyolefins, e.g. polyethylene, propypropylene, poly-1-butene, poly-4-methyl-1-pentene, ethylene-propylene copolymer, copolymers of ethylene with α-olefins having at least 4 carbon atoms, copolymers of polyolefins with maleic anhydride, ethylene-vinyl acetate copolymer, ethylene-acrylic acid ester copolymers and modified polyolefins comprising the foregoing modified with an unsaturated carboxylic acid or derivatives thereof; various nylons, e.g. nylon 6, nylon 66 and nylon 6/66 copolymer; polyvinyl chloride; polyvinylidene chloride; polyesters; polysytrene, polyacrylonitrile, polyrethanes; polyacetals and modified polyvinyl alcohols. It is still further possible to laminate, in particular by co-extrusion lamination, the saponified product of ethylene-vinyl acetate copolymer obtained by the present invention with the above thermoplastic resins to obtain multilayered structures, which are then put in practical uses. It is yet further possible to co-extrusion or solution coating the saponified product composition of ethylene-vinyl acetate copolymer onto paper, plastic film, metal foil or like base films.

EXAMPLES

Other features of the invention will become apparent in the course of the following descriptions of exemplary embodiments which are given for illustration of the invention and are not intending to be limiting thereof. In the Examples and Comparative Examples that follow, the content of polyene remaining in a saponified product of copolymer, degree of coloring of film and level of gel-like agglomerates generated in a film were determined according to the following methods.

Content of polyene remaining in a saponified copolymer

A saponified product of ethylene-vinyl acetate copolymer was pulverized. The obtained powder was sifted through a 100-mesh sieve, to remove coarse particles. Ten grams of the resulting fine powder was Soxhlet-extracted with 100 ml of chloroform for 48 hours. The amount of polyene in the extract was determined by high-performance liquid chromatography with an analytical curve prepared from standard polyene samples.

Degree of coloring

In Examples 1 through 7 and Comparative Examples 1 through 5, film sample was dissolved in dimethyl sulfoxide to a concentration of 50 g/l and the solution was tested for absorbancy at a wave length of 360 nm. The degree of coloring was judged by the following 3-stage rating.

Degree of coloring 1: almost no coloring )absorbancy: less than 0.10)

Degree of coloring 2: slightly colored (absorbancy; at least 0.10 and less than 0.25)

Degree of coloring 3: markedly colored (absorbancy: at least 0.25)

In Examples 8 through 13 and Comparative Examples 6 through 11, the absorbancy values obtained in the same manner were taken, as they were, for evaluation.

Level of gel-like agglomerates

In Examples 1 through 7 and Comparative Examples 1 through 5, film sample was observed over an area of 10 cm×10 cm under a polarization stereoscopic microscope at a magnification of 10 and the number of gel-like agglomerates having a size of at least 100 $\mu$m was counted.

In Examples 8 through 13 and Comparative Examples 6 through 11, the same observation method was employed and the number of gel-like agglomerates having a size of at least 20 $\mu$m was counted.

Example 1

A 100-kg/cm$^2$ pressure-proof polymerization vessel was charged with 19,600 parts of vinyl acetate, 2,180 parts of methanol and 7.5 parts of AIBN (azobisisobutyronitrile). After the air in the vessel had been replaced by nitrogen with stirring, the temperature and pressure were increased to an internal temperature of 60° C. and an ethylene pressure of 35.5 kg/cm$^2$. The temperature and pressure were maintained for 3.5 hours to effect polymerization. Then, a 1% methanolic solution of β-myrcene obtained by dissolving 6.2 parts of β-myrcene {0.0316% by weight/VAc (vinyl acetate)} in methanol was added. The conversion was 47% based on the vinyl acetate fed and the ethylene content was 33 mole %.

After the addition of the polyene, the inside of the polymerization vessel was allowed to be under atmospheric pressure again, to evaporate off ethylene. The residual methanolic solution was continuously flown down through the upper part of a purge column packed with raschig rings, while methanol vapor was blow up through the lower part of the column to discharge the unreacted vinyl acetate monomer together with methanol vapor through the top of the column and remove them by passing through a condenser. This procedure gave a 45% methanolic solution of an ethylene-vinyl acetate copolymer containing less than 0.01% of unreacted vinyl acetate.

The methanolic solution of the ethylene-vinyl acetate copolymer was fed to a saponification reactor, where a sodium hydroxide/methanol solution (80 g/l) was added in such an amount as to make the amount of sodium hydroxide 0.4 equivalent based on the vinyl acetate component in the copolymer. Methanol was further added to adjust the copolymer concentration to 20%. The temperature was raised to 60° C. to effect reaction for about 4 hours, while nitrogen was being blown into the reactor. After the 4 hours, the reaction was terminated by neutralizing the mixture with acetic acid. The contents were taken out from the reactor, and allowed to stand at room temperature for about 20 hours to precipitate into particles. The particles were subjected to liquid removal in a centrifuge and to repeated cycles of adding a large amount of water and dewatering.

The saponified product of ethylene-vinyl acetate copolymer obtained by the final dewatering and drying had a saponification degree of 99.5 mole % and a melt index (190° C. 2160 g) of 2 g/10 min. The content of β-myrcene remaining in the saponified copolymer was 0.05% by weight.

The saponified copolymer was, through a 60 mm-dia. extruder/T-die single-layer film forming machine with which the temperatures of the cylinder, adaptor and die were all set at 230° C. formed into a film having a thickness of 30 $\mu$m.

The film thus obtained had a good color shade, with a degree of coloring of 1. The number of gel-like agglomerates in the film was found to be 5 pieces per 100 cm$^2$.

The results of tests for the properties of the resins and the film are, together with the boiling point of β-myrcene, shown in Table 1.

Examples 2 through 6

Example 1 was repeated except that there was used, instead of β-myrcene, the same moles of 9.3 parts of α-farnesene (0.0474% by weight/VAc, Example 2), 5.1 parts of sorbic acid (0.0260% by weight/VAc, Example 3) or 12.7 parts of eleostearic acid (0.0645% by weight/VAc, Example 4), ⅓ molar equivalent of β-myrcene of 16.6 parts of tung oil (0.0845% by weight/VAc, Example 5) or the same moles of 3.1 parts by weight of isoprene (0.0158% by weight/VAc, Example 6), to produce saponified products of ethylene-vinyl acetate copolymers. Here, the amount of tung oil added to Example 5 was set at ⅓ molar equivalent of other polyenes in consideration of one molecule of tung oil containing 3 trienes.

The saponified copolymers thus obtained were formed into films in the same manner as in Example 1. The results of evaluation of the films are shown in Table 1. With respect to the content of remaining tung oil, the amount of eleostearic acid that formed by hydrolysis in the saponification step is given. The amount of remaining isoprene in Example 6 is not available, since it evaporated during Soxhlet-extraction in chloroform solvent and could not be detected.

Example 7

The particles of the saponified product of ethylene-vinyl acetate copolymer obtained by dewatering and drying in Example 1 were treated with an aqueous solution of acetic acid and sodium dihydrogenphosphate and then subjected to liquid removal and drying, to yield a saponified product of ethylene-vinyl acetate copolymer having a degree of saponification and a melt index of 99.5 mole % and 2.1 g/10 min, respectively. The saponified product of ethylene-vinyl acetate copolymer was analyzed for each component, which was found to be as follows.

| | |
|---|---|
| Acetic acid | 0.05% |
| Sodium acetate | 0.0075% |
| Sodium dihydrogenphosphate | 0.05% |
| β-myrcene | 0.05% |

The saponified product was formed into a film in the same manner as in Example 1. The results of evaluation on the film are shown in Table 1.

Comparative Examples 1 through 4

Example 1 was repeated except that there was used, instead of β-myrcene, the same moles of 4.7 parts of styrene, (0.0241% by weight/VAc, Comparative Example 1), 10.7 parts of 2,4-diphenyl-4-methyl-1-pentene (hereinafter sometimes referred to as DPMP) (0.0548% by weight/VAc, Comparative Example 2), 4.6 parts of tiglic acid (0.0232% by weight/VAc, Comparative Example 3) or 2.5 parts of 1,3-butadiene (0.0125% by weight/VAc, Comparative Example 4), to produce saponified products of ethylene-vinyl acetate copolymers.

The saponified copolymers thus obtained were formed into films in the same manner as in Example 1. The results of evaluation on the films are shown in Table 1. The amount of remaining 1,3-butadiene in Comparative Example 4 could not be determined for the same reason as in Example 6.

Comparative Example 5

Example 1 was repeated except that no additive was used instead of β-myrcene, to produce a saponified product of ethylene-vinyl acetate copolymer. The saponified copolymer was formed into a film in the same manner as in Example 1. The results of evaluation on the film are shown in Table 1.

| Ethylene-vinyl acetate copolymer (ethylene content: 34 mole %) | 46% by weight |
|---|---|
| Vinyl acetate | 32% by weight |
| Ethylene | 8.7% by weight |
| Methanol | 10% by weight |

To the polymerization mixture just after the discharge from the polymerization vessel, a 1.0 g/l solution of β-myrcene in methyl acetate was added at a rate of 0.20 l/hr and stirred. The mixture was introduced to a tray tower, where methanol vapor was blown into through the bottom at a rate of 3.5 kg/hr, to separate unreacted vinyl acetate and ethylene through the tower top. From the tower bottom, a 45% by weight solution of an ethylene-vinyl acetate copolymer in methanol was obtained at a rate of 7.2 kg/hr.

A methanolic solution obtained by adding 1 part by weight of sodium hydroxide to 100 parts by weight of the thus obtained copolymer solution was saponified for 30 minutes at 110° C., 3.5 kg/cm², while methanol vapor was being blown into. The methyl acetate that formed during the reaction was distilled together with part of the methanol and removed out of the zone. Into the obtained saponification

TABLE 1

Evaluation of saponified products of ethylene-vinyl alcohol copolymers and films

| | Polyene added | Boiling point (° C.) | Amount of polyene remaining in film (% by weight) | Degree of coloring of film (Rating) | Level of gel-like agglomerates in film (pcs/100 cm²) |
|---|---|---|---|---|---|
| Example 1 | β-Myrcene | 167 | 0.05 | 1 | 5 |
| 2 | α-Farnesene | 260 | 0.09 | 1 | 5 |
| 3 | Sorbic acid | 228 | 0.002 | 1 | 3 |
| 4 | Eleostearic acid | >300 | 0.005 | 1 | 3 |
| 5 | Tung oil | >300 | 0.008 | 1 | 4 |
| 6 | Isoprene | 34.1 | Not available | 1 | 10 |
| 7 | β-Myrcene | 167 | 0.05 | 1 | 4 |
| Comparative Example 1 | Styrene | 143 | 0.03 | 2 | 80 |
| 2 | 2,4-Diphenyl-4-methyl-1-pentene | 314 | 0.07 | 2 | 30 |
| 3 | Tiglic acid | 199 | 0.002 | 2 | 300 |
| 4 | 1,3-Butadiene | −4.4 | Not available | 2 | 150 |
| 5 | None | — | — | 3 | >500 |

Example 8

Continuous polymerization was conducted with a 100-l polymerization vessel equipped with an internal cooling coil and 4-wing puddle-type stirrer. The polymerization conditions were as follows.

| Feed rate of vinyl acetate feed | 5.0 kg/hr |
|---|---|
| Feed rate of 2,2-azobis-(2,4-dimethylvaleronitrile) as 2.8 g/l methanolic solution | 0.3 l/hr |
| Polymerization temperature | 60° C. |
| Ethylene pressure in vessel | 45 kg/cm² |
| Average residence time | 7 hours |

As a result, a polymerization mixture with a conversion of vinyl acetate of about 55% was discharged from the polymerization vessel at a rate of 7 kg/hr and had the following composition.

mixture, water-methanol was further blown, to distill mixed vapor of methanol-water, whereby a 35% by weight solution of the saponified product of the copolymer in a mixed solvent of methanol water (methanol/water=65.35 by weight) was obtained. The solution was then extruded through a die with a hole having a diameter of 2 mm into a mixed liquid of water/methanol (methanol: 10% by weight) at 5° C. to be coagulated therein and form a strand. The strand thus obtained was cut with a cutter into pellets having a length of 2.5 to 3.5 mm. The pellets were washed with 15 parts by weight based on 1 part by weight thereof of process water, and then dewatered and dried.

The saponified product of ethylene-vinyl acetate copolymer pellets obtained after the dewatering and drying were treated with an aqueous solution of acetic acid and sodium dihydrogenphosphate in the same manner as in Example 7 and again subjected to liquid removal and drying, to give a saponified product of ethylene-vinyl acetate copolymer having a degree of saponification and a salt index of 99.4 mole % and 2.0 g/10 min. respectively. The saponified product of ethylene-vinyl acetate copolymer was analyzed for each component, which was found to be as follows. The contents of acetic acid, sodium acetate and sodium dihydrogenphosphate were the same in Example 9 through 13 and Comparative Examples 6 through 11 to be described next.

| | |
|---|---|
| Acetic acid | 0.05% |
| Sodium acetate | 0.0075% |
| Sodium dihydrogenphosphate | 0.01% |
| β-myrcene | 0.05% |

The saponified product was formed into a film in the same manner as in Example 1 and the film was evaluated. The film showed an absorbancy of 0.09, thus proving to have good color shade. The number of gel-like agglomerates having a size of at least 20μ was 5 pieces per 100 cm².

Examples 9 through 13 and Comparative Examples 6 through 11

Continuous polymerization was effected in the same manner as in Example 8 except that the polymerization catalyst and the polyene were changed as described below, to obtain saponified products of ethylene-vinyl acetate copolymers.

Here, the amount of each of the catalysts added was adjusted such that a polymer solution having the same conversion, degree of polymerization and ethylene content would be obtained. Concretely, AMV (2,2'-azobis-(2,4-dimethylvaleronitrile)) was added in a concentration of 1.3 g/l. AIBN (2,2'-azobisisobutyronitrile) in 1.9 g/l and NPP (di-n-propyl peroxidicarbonate in 0.5 g/l of methanolic solutions and all at a feeding rate of 0.7 l/hr.

Further β-myrcene was as a 2.0 g/l solution in methyl acetate, sorbic acid as a 1.7 g/l solution in methanol and 2,4-diphenyl-4-methyl-1-pentene as a 3.5 g/l solution in methanol, each added at a feeding rate of 0.1 l/hr, so that the rate of moles added would be the same as that of β-myrcene in Example 8. With no addition of any additive after polymerization, only methanol was added at a feeding rate of 0.1 l/hr.

The polymerization catalyst and polyene used in each of Examples and Comparative Examples were as follows.

| | Catalyst | Polyene |
|---|---|---|
| Example 9 | AMV | Sorbic acid |
| Comparative Example 6 | AMV | DPMP |
| Comparative Example 7 | AMV | None |
| Example 10 | AIBN | β-Myrcene |
| Example 11 | AIBN | Sorbic acid |
| Comparative Example 8 | AIBN | DPMP |
| Comparative Example 9 | AIBN | None |
| Example 12 | NPP | β-Myrcene |
| Example 13 | NPP | Sorbic acid |
| Comparative Example 10 | NPP | DPMP |
| Comparative Example 11 | NPP | None |

The saponified products of ethylene-vinyl acetate copolymers thus obtained were formed into films in the same manner as in Example 1. The results of evaluation on the obtained films are shown in Table 2.

Obviously, numerous variations and modifications of the invention are possible in light of the above teachings. It is therefore to be understood that within the scope of the appended claims, the invention may be practiced otherwise than as specifically described herein.

TABLE 2

Evaluation of saponified products of ethylene-vinyl alcohol copolymers and films

| | Polyene added | Polymerization catalyst Type | Half life (hours) | Amount of polyene remaining in film (% by weight) | Degree of coloring of film (Absorbancy) | Level of gel-like agglomerates in film (pcs/100 cm²) |
|---|---|---|---|---|---|---|
| Example 8 | β-Myrcene | AMV | 0.22 | 0.05 | 0.04 | 8 |
| 9 | Sorbic acid | AMV | 0.22 | 0.002 | 0.03 | 7 |
| Comparative Example 6 | 2,4-Diphenyl-4-methyl-1-pentene | AMV | 0.22 | 0.07 | 0.14 | 25 |
| 7 | None | AMV | 0.22 | — | 0.30 | >500 |
| Example 10 | β-Myrcene | AIBN | 20 | 0.05 | 0.09 | 15 |
| 11 | Sorbic acid | AIBN | 20 | 0.003 | 0.08 | 18 |
| Comparative Example 8 | 2,4-Diphenyl-4-methyl-1-pentene | AIBN | 20 | 0.06 | 0.20 | 60 |
| 9 | None | AIBN | 20 | — | 0.60 | >500 |
| Example 12 | β-Myrcene | NPP | 0.58 | 0.04 | 0.02 | 5 |
| 13 | Sorbic acid | NPP | 0.58 | 0.003 | 0.02 | 4 |
| Comparative Example 10 | 2,4-Diphenyl-4-methyl-1-pentene | NPP | 0.58 | 0.06 | 0.12 | 15 |
| 11 | None | NPP | 0.58 | — | 0.40 | >500 |

What is claimed is:

1. A resin composition comprising:
   (a) a saponified product of an ethylene-vinyl acetate copolymer and
   (b) 0.000001 to 1 weight %, based on the resin composition, of a conjugated polyene having a boiling point of at least 20° C.,
   wherein said copolymer has an ethylene content of 5 to 60 mol % based on the copolymer.

2. The resin composition according to claim 1, wherein said conjugated polyene has a boiling point higher than that of vinyl acetate.

3. The resin composition according to claim 1, wherein said conjugated polyene has a functional group containing an oxygen atom.

4. The resin composition according to claim 1, wherein said conjugated polyene has a carboxyl group, a salt thereof, a hydroxyl group or an ester group.

5. The resin composition according to claim 1, wherein said conjugated polyene is polyenecarboxylic acid or a salt or an ester thereof.

6. The resin composition according to claim 1, wherein said conjugated polyene is sorbic acid.

7. The resin composition according to claim 1, wherein said copolymer has an ethylene content of 10 to 50 mol %.

8. The resin composition according to claim 1, wherein said copolymer has a degree of saponification of at least 95% of the vinyl acetate component.

9. The resin composition according to claim 1, wherein said resin composition comprises 0.0001 to 0.2% by weight of the conjugated polyene.

10. The resin composition according to claim 1, wherein said copolymer has an ethylene content of 10 to 50 mol % and a degree of saponification of at least 95% of the vinyl acetate component and said resin composition comprising 0.0001 to 0.2% by weight of sorbic acid.

11. A resin composition comprising a saponified product of a vinyl acetate polymer and 0.000001 to 1% by weight of a conjugated polyene having a functional group containing an oxygen atom.

12. The resin composition according to claim 11, wherein said vinyl acetate polymer is an ethylene-vinyl acetate copolymer.

13. The resin composition according to claim 11, wherein said conjugated polyene is polyenecarboxylic acid or a salt or an ester thereof.

14. The resin composition according to claim 11, wherein said conjugated polyene is sorbic acid.

15. The resin composition according to claim 11, wherein said copolymer has a degree of saponification of at least 95% of the vinyl acetate component.

16. The resin composition according to claim 11, wherein said resin composition comprises 0.0001 to 0.2% by weight of said conjugated polymer.

* * * * *

UNITED STATES PATENT AND TRADEMARK OFFICE
CERTIFICATE OF CORRECTION

PATENT NO.    : 6,288,165 B1
DATED         : September 11, 2001
INVENTOR(S)   : Moritani et al.

It is certified that error appears in the above-identified patent and that said Letters Patent is hereby corrected as shown below:

<u>Title page,</u>
Insert Item [62], the Related U.S. Application information should read:
--                    Related U.S. Application Data
[62]   Division of Application Serial No. 08/668,466, filed on June 25, 1996, now Patent No. 5,744,547. --

Signed and Sealed this

Second Day of July, 2002

*Attest:*

*Attesting Officer*

JAMES E. ROGAN
*Director of the United States Patent and Trademark Office*